United States Patent [19]
Johnson

[11] 3,886,742
[45] June 3, 1975

[54] SINGLE PUMP HYDROSTATIC TRANSMISSION CONTROL AND SUPPLY SYSTEM

[75] Inventor: Gordon W. Johnson, Peoria, Ill.

[73] Assignee: Caterpillar Tractor Co., Peoria, Ill.

[22] Filed: Sept. 20, 1974

[21] Appl. No.: 507,759

Related U.S. Application Data

[62] Division of Ser. No. 427,087, Dec. 12, 1973.

[52] U.S. Cl. .................. 60/488; 60/490; 60/455; 60/456; 91/444
[51] Int. Cl. ............................................ F15b 11/02
[58] Field of Search ........ 91/418, 444; 60/473, 487, 60/488, 490

[56] References Cited
UNITED STATES PATENTS

| | | | |
|---|---|---|---|
| 3,142,962 | 8/1964 | Lohbauer | 60/427 X |
| 3,477,225 | 11/1969 | Cryder et al. | 60/427 X |

*Primary Examiner*—Edgar W. Geoghegan
*Attorney, Agent, or Firm*—Phillips, Moore, Weissenberger, Lempio & Strabala

[57] ABSTRACT

A system for supplying control, actuation, and other functions in a hydrostatic transmission. The supply system includes singular pump means for supplying fluid under pressure to a pressure compensated flow control valve which functions to supply a constant volumetric rate of fluid flow to a modulatable speed control valve. The modulatable speed control valve creates a pressure differential thereacross which differential is communicated to direction and speed control cylinders for regulating pump and motor components of the hydrostatic transmission. Fluid in excess of that required for supplying the constant volumetric flow rate to the speed control valve is passed through a portion of the pressure compensated flow control valve to operate servo valves and displacement control actuators in the transmission. The pressure of such excess fluid is controlled by means of a relief valve which opens to dump fluid to a drain conduit whenever the pressure of such fluid reaches a predetermined value. Additional excess fluid beyond that required for the control and actuation functions is transmitted from the relief valve to a relief and replenishing valve group for assuring an ample fluid supply for the hydrostatic transmission components. Fluid passing from the singular supply pump is transmitted through a heat compensated venturi mechanism which provides inlet and throat pressure signals, proportional to flow rate, to an underspeed safety valve means which function to open a parallel flow path to that controlled by the speed control valve at such times as the speed of the engine associated with the hydrostatic transmission drops off to cause a decrease in flow from the singular supply pump. In addition to supply fluid for the previously discussed functions, fluid supplied by the singular supply pump is also available to scavenge leakage fluid from various portions of the system by virtue of the passage thereof through a jet pump.

4 Claims, 1 Drawing Figure

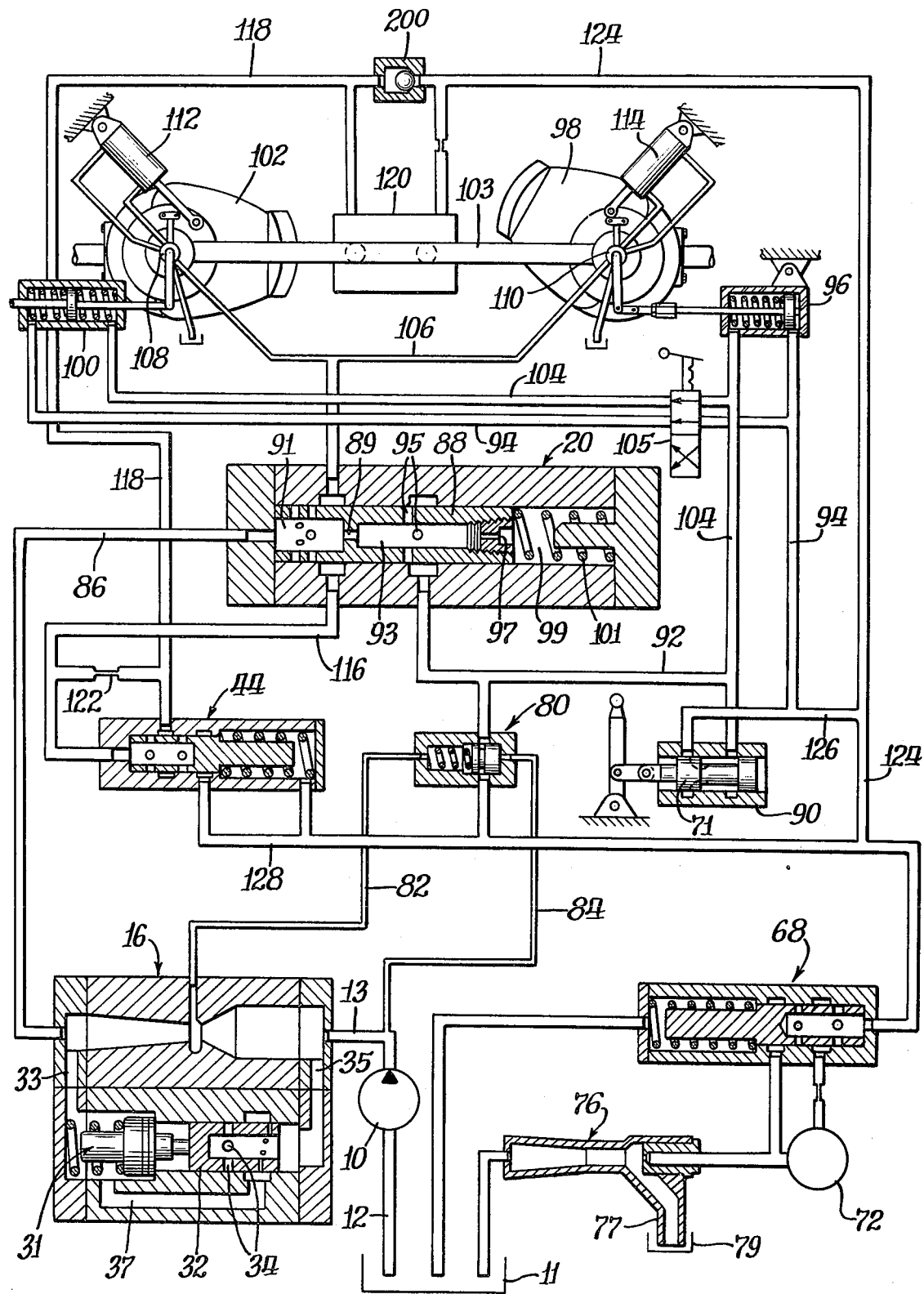

SINGLE PUMP HYDROSTATIC TRANSMISSION CONTROL AND SUPPLY SYSTEM

This is a division, of Ser. No. 427,087, filed Dec. 12, 1973.

BACKGROUND OF THE INVENTION

Heavy earth moving vehicles frequently use hydrostatic transmissions because of their adaptability to varying load applications and because they afford an infinitely variable ratio between the speed of the vehicle engine and the ground speed of the vehicle. The most frequently utilized hydrostatic transmissions employ a pump and motor, both of which have variable displacement characteristics.

Such transmissions require an especially effective and precise control system since relative changes in the displacement of the pump and motor must be properly sequenced for efficient operation of the transmission and for providing a desirable torque ratio for the system. For an example of such a control system for a hydrostatic transmission, reference may be had to U.S. Pat. application Ser. No. 222,041, filed on Jan. 31, 1972 now U.S. Pat. No. 3,771,310 by John R. Cryder, et al, entitled "Hydrostatic Drive Control System." The system disclosed in said application includes a so-called "positive pressure speed control" arrangement and is assigned to the Assignee of the present invention.

Because of the precise requirements of such hydrostatic transmission control systems, prior art systems have often been complicated and expensive by virtue of the multiplicity of special valves and other components required. Some prior art systems included separate independent supply pumps for supplying fluid for various functions including speed control, relief and replenishing, and operation of displacement control actuators. Despite the additional hardware in such multiple pump arrangements, the results have often been less than optimum owing chiefly to the need for additional horsepower which must be diverted from tractive effort for the operation of the arrangement and to the often insufficiently sensitive response thereof to system demands. Some additional examples of prior art control systems are provided by U.S. Pat. Nos. 3,187,509; 3,212,263; 3,236,049; 3,238,724; and 3,247,669.

SUMMARY AND OBJECTS OF THE INVENTION

The instant invention provides an improved control and actuation system for a hydrostatic transmission. The invention includes a single supply pump for supplying fluid to a pressure compensated flow control valve which valve provides a constant volumetric flow rate for a manually operated differential pressure-type speed control valve for controlling the speed and direction of the components of the hydrostatic transmission. The system also includes underspeed valve means and a heat compensated, speed-sensing venturi mechanism for the operation thereof. The singular supply pump also supplies fluid for actuating the displacement control actuators of a pump and motor of the transmission and for a relief and replenishing system therefor. Fluid supplied by the singular supply pump in excess of that required for speed control, actuation, and relief and replenishing functions, is utilized to drive a jet pump which scavenges fluid leakage from various areas of the vehicle to which the transmission is adapted, such as the gear case.

One of the objects of the present invention is to provide a control and supply system for a vehicle hydrostatic transmission which requires the diversion of relatively little power from tractive effort of the vehicle.

Another object of the present invention is to provide a control and supply system with superior speed control characteristics owing to the use of a differential pressure speed control valve operatively supplied by pressure compensated flow control valve which supplies a constant volumetric fluid flow rate regardless of vehicle engine speed.

A still further object of the present invention is to provide a single pump supply system which supplies fluid for speed control of a hydrostatic transmission while also supplying driving fluid for a jet pump usuable for scavaging leakage fluid.

Other objects and advantages of the present invention will become apparent from the following description and drawing.

BRIEF DESCRIPTION OF THE DRAWING

The sole FIGURE in the drawing is a schematic representation of the essential components of the instant control and supply system.

DETAILED DESCRIPTION

With reference to the drawing, the components and operation of the instant single pump control and supply system may be appreciated. A hydrostatic transmission which is controlled by the instant system is comprised of a variable displacement reversible pump 102 and a variable speed motor 98 intercommunicated by fluid communication means 103. The displacements of the pump and motor are conventionally controlled by conventional displacement actuators 112 and 114 which are, in turn, controlled by displacement servo valves 108 and 110, respectively, which regulate the flow of fuid to the displacement actuators. The servo valves are, in turn, regulated respectively by a direction and displacement control cylinder 100 and a speed control cylinder 96 mechanically linked to the servo valves.

The transmission is also equipped with a standard relief and replenishing valve group 120 suitably communicated to the instant control system by fluid communication means 118, 200, and 124. As will become apparent from the following discussion, fluid for the speed and direction control elements of the hydrostatic transmission as well as for the displacement actuators and relief and replenishing system will be supplied by the single pump control and supply arrangement of the instant invention.

The instant control and supply system includes a fluid pump 10 which draws fluid from a low pressure reservoir 11 through a conduit 12 and supplies fluid through a conduit 13 to a heat compensated venturi mechanism shown generally at 16. The size and capacity of pump 10 is determined by calculating the amount of fluid to properly cool the system and adding to that the anticipated fluid leakage from the system. Pilot signals from the inlet and throat portions of the venturi are provided to an underspeed valve 80 by means of conduits 84 and 82, respectively. The heat compensated venturi mechanism includes a conventional thermal compensator 31 which senses the temperature of fluid flowing through the venturi by way of a passage 33 and, upon the attainment of a predetermined fluid temperature, shifts a spool 32 rightwardly, as shown in the drawing, to permit a portion of the fluid entering the venturi through line 13 to pass through a passage 35, ports 34, a passage 37, and a passage 33 to by-pass the venturi and provide a radically changed pressure signal in the system which alerts an observer as to the overheating condition.

Fluid exits from the venturi mechanism through a conduit 86 and enters a pressure compensated flow control valve shown generally at 20. The purpose of this flow control valve is to supply a constant volumetric fluid flow rate for speed control functions. The valve includes a flow controlling spool 88 which has a flow restricting orifice 89 which communicates an inlet chamber 91 with a spool chamber 93, as shown. The spool also includes a plurality of radial ports 95 which communicate to a greater or lesser extent with a supply conduit 92 depending upon the position of the valve spool 88. Another orifice 97 leads from the chamber 93 to a spring chamber 99. As may be readily appreciated from the drawing, the spool 88 tends to move rightwardly under the influence of pressure in the chamber 91 and is opposed in such rightward tendency by the spring 101 and the pressure within chamber 99. Flow through the orifice 89 creates a pressure drop in the chamber 93 which pressure drop increases with increasing flow velocity through the orifice 89. The greater the pressure differential across the orifice, the further the spool 88 moves rightwardly to vary the volume of the fluid communicating between the chamber 93 and the line 92. Valve spool 88 also contains radial ports in the chamber 91 to communicate excess fluid to a line 116 when the spool 88 moves rightwardly to a position which enables communication between such ports and the line 116. A more detailed explanation of the principal of operation of the constant volume flow rate control valve 20 may be had with reference to U.S. Pat. No. 3,142,962 to Lohbauer, of common assignment herewith.

The valve outlet conduit 92 communicates directly with a speed control valve 90, which has a modulating valve spool 71 with lands and modulating grooves thereon, is manually actuable to create a selectively variable pressure differential across the speed control valve with the upstream pressure from line 92 being directed to a branched line 94 to the head end of the speed control cylinder 96 and to one end of the control cylinder 100, as shown. Downstream pressure fluid from the differential speed control valve 90 is directed through a branched line 104 to the rod end of the speed control cylinder 96 and to the opposite end of the control cylinder 100 for the pump 102. A good example of a differential speed control valve like the valve 90 is shown at 79 in U.S. Pat. No. 3,477,225 to Cryder et al, of common assignment herewith. This patent also discloses an underspeed valve 80 which functions in a manner similar to the instant underspeed valve.

A conventional manually operable direction control valve 105 is disposed across the lines 94 and 104 to permit an operator to manually select the chamber of the control cylinder 100 to which is directed the high pressure fluid from line 94 to select the direction in which the pump 102 will operate. It will be appreciated that the cylinder 100 progressively varies the displacement of the pump 102 from zero to maximum as the piston thereof moves from the center position shown to the extreme end positions in either direction selected by means of the valve 105. In a typical installation, changing the direction of pump 102 causes a change in the direction of the vehicle to which the system is adapted.

The above discussion essentially completes the description of the speed and direction control functions of the instant system. The system also supplies fluid for operating the displacement actuators of the transmission and for performing other functions, to be explained hereinafter.

Fluid from the line 86 in excess of that required to supply a constant volume of fluid to the line 92 is passed to a line 116 which communicates through radial ports with the chamber 91. Some of this excess fluid is communicated by way of a branched line 106 to supply the pump and motor displacement servo valves 108 and 110 which, in turn, selectively supply fluid pressure to the actuators 112 and 114, as previously described. Also communicating with the line 116 is a relief valve 44 which functions to control the pressure of the fluid in the displacement actuator line 106. The valve 44 operates to dump excess pressure fluid to a line 128 upon movement of the spool therein rightwardly against the bias or the spring, shown in the drawing. It will also be noted that fluid entering the valve 44 through the line 116 is communicated by means of radial ports to the line 118 which line communicates directly with a relief and replenishing valve group shown generally at 120 in the drawing. A branch line containing an orifice 122 provides restricted communication between the lines 116 and 118 to avoid starvation of the relief and the replenishing valve group during temporary conditions in the actuator system wherein the pressure therein is below that necessary to open the relief valve 44 to allow flow from the line 116 through the radial valve ports to the line 118.

In addition to supplying fluid for speed and displacement controls, for actuation of the displacement actuators, and for the relief and replenishing circuit of the hydrostatic transmission, the single pump system of the present invention also supplies fluid for additional purposes. For example, some of the excess oil from the reduced pressure conduit 104 is communicated to a return line 124 which also serves to return excess hot fluid from the transmission to a fluid cooler 72 by way of a pressure responsive cooler by-pass valve 68. Also combined with the excess flow from the speed control valve and the flow from the relief and the replenishing group is excess fluid from the relief valve 44 via the line 128.

Fluid passing through the cooler 72 or, through the pressure responsive cooler by-pass valve 68 under high pressure conditions, is transmitted to a jet pump 76. The throat of the jet pump is communicated by way of a line 77 to a source of leakage oil from the transmission. For instance, the jet pump could be used to scavenge oil leaking into the gear box 79 of the vehicle to which this system is adapted.

Proximate the relief and the replenishing valve group is a double acting ball check valve 200 which is interposed between the lines 118 and 124 to insure that the relief and replenishing group is not starved by virtue of communication of fluid from the line 118 to the cooler via the line 124 when the pressure in line 124 is relatively low.

It may be readily appreciated that the present system utilizes a single pump 10 to supply all of the control and actuation functions of the hydrostatic transmission to which it is adapted. The system maintains a constant regulated volume of fluid to a speed control system which utilizes a pressure differential-type speed control valve so that minor operational changes such as varying engine speed, increased pump leakage, or the like, do not affect the speed and directional signals to the control elements. The particular differential pressure speed control elements utilized in the present system provide an extremely sensitive speed control means which is particularly useful when supplied with a constant volumetric fluid flow as is the present system.

While the invention has been described with particular reference to the preferred embodiments, it is apparent that variations and modifications are possible within the purview of the inventive concepts. No limitation with respect to such variations and modifications is intended, except by the scope of the appended claims.

I claim:

1. A supply and control system for a hydrostatic transmission including; a source of fluid under pressure, flow control valve means for providing a constant volumetric rate of fluid flow, first fluid communication means between said source and said flow control valve means, speed control valve means for regulating the flow of fluid from said constant volumetric rate of flow provided by said flow control valve means to speed control means of said hydrostatic transmission, second fluid communication means between said speed control valve means and said flow control valve means, and third fluid communication means between said speed control valve means and said speed control means of said transmission.

2. The invention of claim 1 wherein said flow control valve means include a first housing and a flow regulating first spool movably disposed within said first housing, said spool having first and second chambers therein, said first chamber communicating with said first fluid communication means and said second chamber communicating with said second fluid communication means, first orifice means in said first spool between said first and second chambers for creating a drop in pressure of fluid flowing from said first chamber to said second chamber for causing movement of said first spool.

3. The invention of claim 2 wherein said source includes a fluid supply reservoir and a singular fluid pump.

4. The invention of claim 3 wherein said hydrostatic transmission includes a fluid pump and a fluid motor coupled by means of fourth fluid communication means.

* * * * *

UNITED STATES PATENT AND TRADEMARK OFFICE
CERTIFICATE OF CORRECTION

PATENT NO. : 3,886,742
DATED : June 3, 1975
INVENTOR(S) : GORDON W. JOHNSON

It is certified that error appears in the above-identified patent and that said Letters Patent are hereby corrected as shown below:

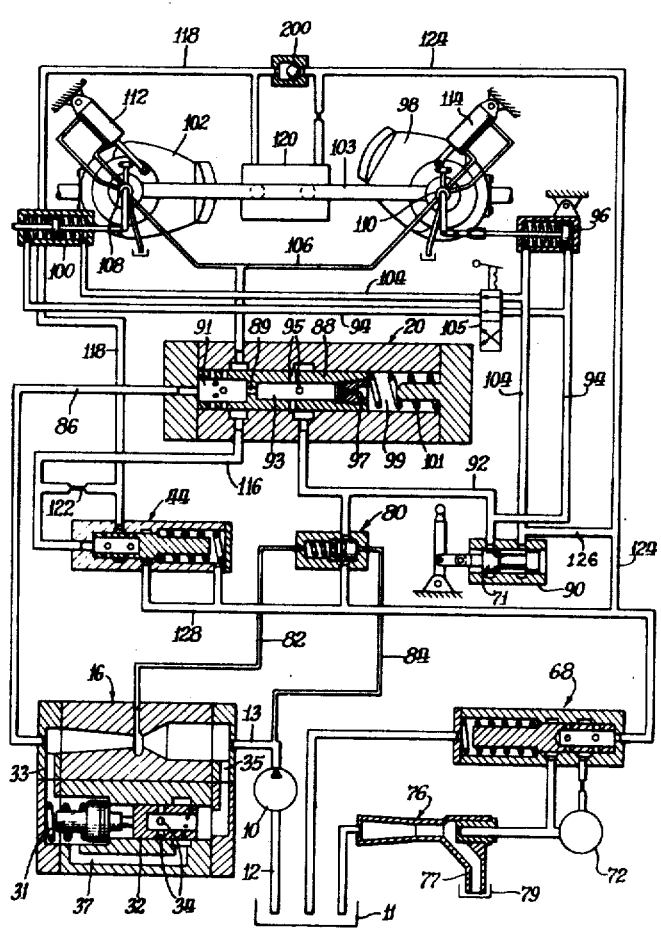

Signed and Sealed this

Tenth Day of August 1976

[SEAL]

Attest:

RUTH C. MASON
Attesting Officer

C. MARSHALL DANN
Commissioner of Patents and Trademarks